US009824502B2

United States Patent
Tong et al.

(10) Patent No.: US 9,824,502 B2
(45) Date of Patent: Nov. 21, 2017

(54) SKETCH SELECTION FOR RENDERING 3D MODEL AVATAR

(71) Applicant: Intel Corporation, Santa Clara, CA (US)

(72) Inventors: Xiaofeng Tong, Beijing (CN); Qiang Eric Li, Beijing (CN); Yangzhou Du, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/779,491

(22) PCT Filed: Dec. 23, 2014

(86) PCT No.: PCT/CN2014/094602
§ 371 (c)(1),
(2) Date: Sep. 23, 2015

(87) PCT Pub. No.: WO2016/101124
PCT Pub. Date: Jun. 30, 2016

(65) Prior Publication Data
US 2016/0328886 A1 Nov. 10, 2016

(51) Int. Cl.
*G06T 19/20* (2011.01)
*G06T 13/40* (2011.01)
(Continued)

(52) U.S. Cl.
CPC .............. *G06T 19/20* (2013.01); *G06F 3/011* (2013.01); *G06F 3/044* (2013.01); *G06F 3/0488* (2013.01);
(Continued)

(58) Field of Classification Search
CPC ....... G06T 2207/30201; G06T 2200/24; G06T 19/20; G06T 19/00
See application file for complete search history.

(56) References Cited

U.S. PATENT DOCUMENTS

2003/0182122 A1    9/2003  Horinaka et al.
2005/0162419 A1*   7/2005  Kim .................. G06T 15/00
                                                      345/419
(Continued)

FOREIGN PATENT DOCUMENTS

CN    101149840 A    3/2008
CN    101354795 A    1/2009
(Continued)

OTHER PUBLICATIONS

Kim et al., Facial Feature Extraction Using PCA and Wavelet Multi-Resolution Images, Proceedings of the Sixth IEEE International Conference on Automatic Face and Gesture Recognition (FGR'04), 2004, 6 pages.*
Sucontphunt et al., Interactive 3D Facial Expression Posing through 2D Portrait Manipulation, Graphics Interface Conference May 28-30, 2008, Windsor, Ontario, Canada, pp. 177-184.*
"U.S. Appl. No. 14/779,501, Preliminary Amendment dated Sep. 23, 2015", 7 pgs.
"U.S. Appl. No. 14/779,535, Preliminary Amendment dated Sep. 23, 2015", 7 pgs.
(Continued)

*Primary Examiner* — Haixia Du
(74) *Attorney, Agent, or Firm* — Schwegman Lundberg & Woessner, P.A.

(57) ABSTRACT

Examples of systems and methods for three-dimensional model customization for avatar animation using a sketch image selection are generally described herein. A method for rendering a three-dimensional model may include presenting a plurality of sketch images to a user on a user interface, and receiving a selection of sketch images from the plurality of sketch images to compose a face. The method may include rendering the face as a three-dimensional model, the three-dimensional model for use as an avatar.

25 Claims, 5 Drawing Sheets

(51) Int. Cl.
*G06F 3/044* (2006.01)
*G06F 3/0481* (2013.01)
*G06F 3/0484* (2013.01)
*G06F 3/0488* (2013.01)
*G06K 9/00* (2006.01)
*G06T 17/00* (2006.01)
*G06F 3/01* (2006.01)

(52) U.S. Cl.
CPC ...... *G06F 3/04815* (2013.01); *G06F 3/04842* (2013.01); *G06F 3/04845* (2013.01); *G06K 9/00228* (2013.01); *G06T 13/40* (2013.01); *G06T 17/00* (2013.01); *G06T 2200/24* (2013.01)

(56) References Cited

U.S. PATENT DOCUMENTS

| | | |
|---|---|---|
| 2005/0271252 A1 | 12/2005 | Yamada |
| 2006/0023923 A1 | 2/2006 | Geng et al. |
| 2006/0294465 A1 | 12/2006 | Ronen et al. |
| 2008/0267459 A1 | 10/2008 | Nakada et al. |
| 2010/0082345 A1 | 4/2010 | Wang et al. |
| 2010/0146052 A1 | 6/2010 | Pare et al. |
| 2010/0302252 A1 | 12/2010 | Petrovic et al. |
| 2011/0007079 A1 | 1/2011 | Perez et al. |
| 2011/0007142 A1 | 1/2011 | Perez et al. |
| 2011/0064388 A1 | 3/2011 | Brown et al. |
| 2011/0292051 A1 | 12/2011 | Nelson et al. |
| 2012/0079377 A1 | 3/2012 | Goossens |
| 2012/0079378 A1 | 3/2012 | Goossens |
| 2012/0139830 A1* | 6/2012 | Hwang ............... G06F 3/012 345/156 |
| 2013/0286161 A1* | 10/2013 | Lv ...................... G06T 7/0065 348/46 |
| 2014/0026102 A1* | 1/2014 | Kinn .................. G06F 3/04815 715/852 |
| 2014/0085293 A1 | 3/2014 | Konoplev et al. |
| 2014/0176662 A1 | 6/2014 | Goodman |
| 2014/0198121 A1 | 7/2014 | Tong et al. |
| 2014/0362091 A1 | 12/2014 | Bouaziz et al. |
| 2015/0332088 A1 | 11/2015 | Chembula |
| 2016/0328875 A1 | 11/2016 | Fang et al. |
| 2016/0328876 A1 | 11/2016 | Tong et al. |

FOREIGN PATENT DOCUMENTS

| | | |
|---|---|---|
| CN | 101499128 A | 8/2009 |
| CN | 102157007 A | 8/2011 |
| CN | 102934144 A | 2/2013 |
| CN | 103093490 A | 5/2013 |
| CN | 102509333 A | 6/2015 |
| TW | 201303747 A | 1/2013 |
| WO | WO-0209040 A1 | 1/2002 |
| WO | WO-2014194439 A1 | 12/2014 |
| WO | WO-2016101124 A1 | 6/2016 |
| WO | WO-2016101131 A1 | 6/2016 |
| WO | WO-2016101132 A1 | 6/2016 |

OTHER PUBLICATIONS

"International Application Serial No. PCT/CN2014/094602, International Search Report dated Sep. 22, 2015", 4 pgs.
"International Application Serial No. PCT/CN2014/094602, Written Opinion dated Sep. 22, 2015", 4 pgs.
"International Application Serial No. PCT/CN2014/094618, International Search Report dated Sep. 24, 2015", 4 pgs.
"International Application Serial No. PCT/CN2014/094618, Written Opinion dated Sep. 24, 2015", 4 pgs.
"International Application Serial No. PCT/CN2014/094622, International Search Report dated Sep. 29, 2015", 4 pgs.
"International Application Serial No. PCT/CN2014/094622, Written Opinion dated Sep. 29, 2015", 4 pgs.
"iTunes Preview: Face Q", by Shenzhen Lianmeng Technology Co.Ltd., [Online]. Retrieved from the Internet: <URL: https://itunes.apple.com/us/app/myotee-lian-meng-ka-tong./id764976183?m>, (Accessed on: May 12, 2016), 2 pgs.
"iTunes Preview: Talking Tom Cat 2", by Outfit7 Limited, [Online]. Retrieved from the Internet: <URL: https://itunes.apple.com/us/app/talking-tom-cat-2/id421997825?mt=8>, (Accessed on: May 12, 2016), 2 pgs.
Cao, Chen, et al., "Displaced Dynamic Expression Regression for Real-time Facial Tracking and Animation", ACM Transactions on Graphics (TOG)—Proceedings of ACM SIGGRAPH, 33(4), (Jul. 2014), 10 pgs.
Garrido, Pablo, et al., "Reconstructing Detailed Dynamic Face Geometry from Monocular Video", ACM Transactions on Graphics (TOG)—Proceedings of ACM SIGGRAPH Asia, 32(6), (Nov. 2013), 10 pgs.
Ruiz, Jamie, et al., "DoubleFlip: A Motion Gesture Delimiter for Mobile Interaction", Proceedings of the SIGCHI Conference on Human Factors in Computing Systems, (May 2011), 2717-2720.
Wang, Heng, et al., "Action Recognition by Dense Trajectories", IEEE Conference on Computer Vision & Pattern Recognition, (2011), 3169-3176.
Xiong, Xuehan, et al., "Supervised Descent Method and its Applications to Face Alignment", IEEE Conference on Computer Vision and Pattern Recognition (CVPR), (Jun. 2013), 532-539.
Zhang, Jie, et al., "Coarse-to-Fine Auto-encoder Networks (CFAN) for Real-time Face Alignment", Computer Vision—ECCV 2014: Proceedings of 13th European Conference, Zurich, Switzerland, Part II, Springer International Publishing, (2014), 1-16.
"U.S. Appl. No. 14/779,501, Non Final Office Action dated Dec. 9, 2016", 35 pgs.
"U.S. Appl. No. 14/779,535, Non Final Office Action dated Dec. 27, 2016", 33 pgs.
Ghimire, et al., "Geometric Feature-Based Facial Expression Recognition in Image Sequences Using Multi-Class AdaBoost and Support Vector Machines", (2013), 7714-7734 pgs.
"U.S. Appl. No. 14/779,501, Final Office Action dated May 5, 2017", 24 pgs.
"U.S. Appl. No. 14/779,501, Notice of Allowance dated Jul. 19, 2017", 7 pgs.
"U.S. Appl. No. 14/779,501, Response filed Jul. 5, 2017 to Final Office Action dated May 5, 2017", 9 pgs.
"U.S. Appl. No. 14/779,535, Notice of Allowance dated Jun. 15, 2017", 8 pgs.

* cited by examiner

SKETCH SELECTION FOR RENDERING 3D MODEL AVATAR

This patent application is a U.S. National Stage Application under 35 U.S.C. 371 from International Application PCT/CN2014/094602, filed Dec. 23, 2014, which is hereby incorporated by reference in its entirety.

BACKGROUND

Users of mobile devices have access to text messaging, image messaging, video, and phone calling. But for those users, expressing emotions or body animations in messages is difficult. An avatar to mimic the face of a user is used to simulate human expression of the user. However, avatars are not able to support customization by users. Animation methods in use today fail to allow users to customize the avatar using sketch images. Animation methods also do not support avatar customization on a mobile device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As a graphic representation of a user in virtual world, an avatar is a popular option in a social network. With the advancement of computer vision and mobile devices, dynamic avatar driven by facial expression, speech, or text now is feasible. However, an avatar that is pre-created by a content or service provider leaves a user with little freedom to customize or edit the avatar. A method may include using a sketch image, such as a two-dimensional (2D) sketch image for a user to create and customize a three-dimensional (3D) model for use as an avatar. The avatar may be used with a facial gesture driven avatar system to animate the avatar.

In an example, a user may customize and adjust a 3D model for use as an avatar, for example, by adjusting a face to be round, flat, square, etc., or a nose to be higher, bigger, smaller, less straight, etc., or a set of eyes to be rounder, narrower, larger, have eyelashes, etc. Other examples of customizations that may be done using sketch images to render a 3D model include changing aspects of a forehead, hair, ears, a mouth, skin color, eye color, lip color, tongue, teeth, or the like.

Figure 1A:
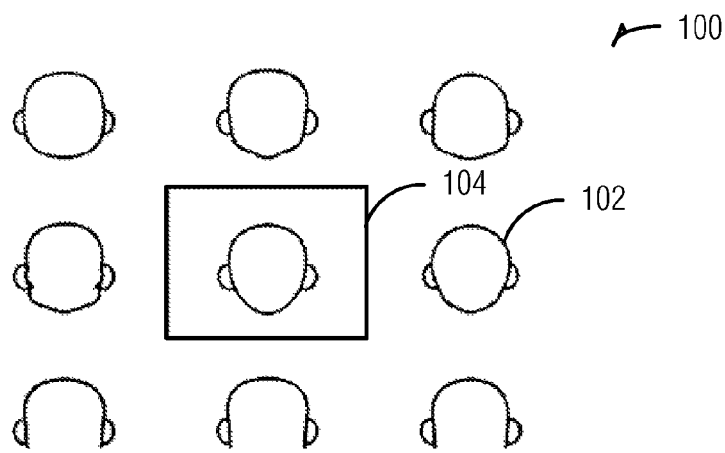
FIGS. 1A-1C are diagrams illustrating sketch images of facial features, according to an embodiment.
Figure 1B:
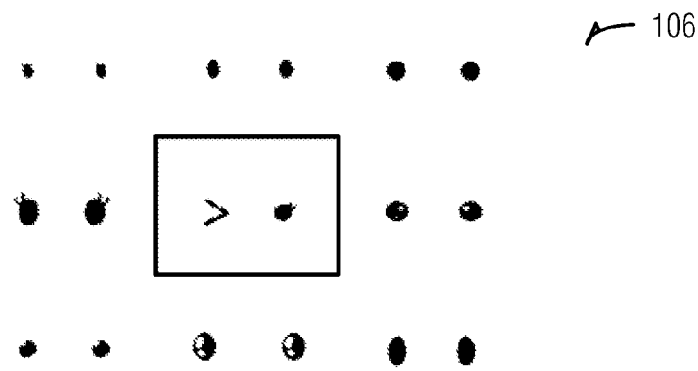
Figure 1C:
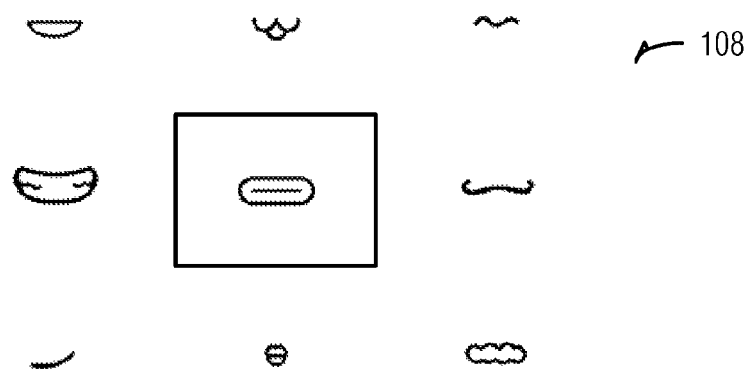

FIGS. 1A-1C are diagrams illustrating sketch images of facial features, according to an embodiment. FIG. 1A shows a head sketch image display 100 of sketch images, such as selected head sketch image 104 and unselected head sketch image 102. FIG. 1B shows an eye sketch image display 106 with sketch images of eyes. FIG. 1C shows a mouth sketch image display 108 with sketch images of mouths. The head sketch image display 100, eye sketch image display 106, and mouth sketch image display 108 are examples of sketch images that may be shown to a user for selection of base shapes of the various facial features. Once a user selects a base shape (e.g., sketch), the user may then select a size of the base shape. The selected sketch images may be used to render a 3D model for use as an avatar. To render the 3D model, facial expression blendshapes may be automatically converted to new customized shapes corresponding to the selected base shapes. The avatar may be animated including animating aspects of the base shapes selected by the user. The blendshapes may be used in facial tracking driven avatar animation.

In an example, a 3D model may be rendered from a selection of sketch images from a plurality of sketch images presented to a user. The sketch images may be 2D and correspond to 3D shapes. A 2D sketch image may be mapped to a 3D shape using 3D parameters. When a user chooses a sketch, a system may generate a corresponding 3D model. It may be more difficult to directly manipulate a 3D model on a mobile device due to small screen size and insensitivity of touch interaction, than selecting a 2D sketch image.

Figure 2:
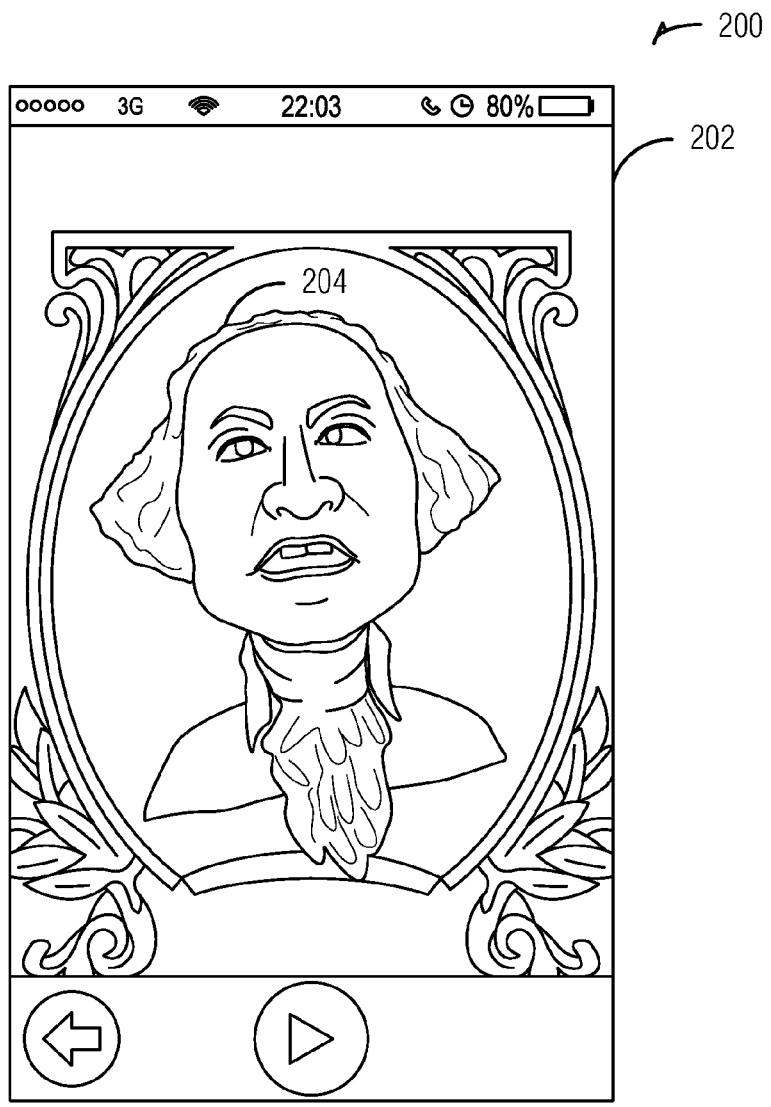
FIG. 2 is a diagram illustrating a three-dimensional avatar for animating, according to an embodiment.

FIG. 2 is a diagram illustrating a 3D avatar for animating, according to an embodiment. In an example, a system 200 may include a mobile device 202 with a user interface for displaying an avatar 204. The avatar 204 may be a 3D model and may be animated. The system 200 may include a processing module to create a 3D model from a face database. The face database may include face samples that have the same vertex number, triangle number and connection topology. The face samples may include base shapes of facial features that may be modeled and animated. For example, the vertex number may define 3D space coordinates of points on a model and the triangle number may define the vertex connection topology. The 3D model of the avatar 204 may be animated using base shapes, such as with an equation:

$$X = X_0 + \sum_{i=0}^{n} P_i \lambda_i$$

Where X is the animation vector, $X_0$ is a mean vector for base shape (e.g., the average of all vectors), $P_i$ is an i-th eigen-vector and $\lambda_i$ is an i-th eigen-value for the corresponding eigen-vector.

In an example, with different settings of parameters, different face shapes may be generated. A metric may be defined to measure a face shape, such as roundness, height, width, etc., and a typical face shape may be defined. Face samples may be generated from the typical face shape and the metric, such as by adjusting coefficients of eigen-values (e.g., the metric) of eigen-vectors that may represent the typical face shape. The coefficients may be adjusted in Principal Component Analysis (PCA) space. PCA may be used to convert the coefficients into linearly uncorrelated coefficients using an orthogonal transformation. The principal components are the linearly uncorrelated coefficients. From the face samples, data pairs may be generated, including one factor for the coefficients of eigen-values, and another factor for a corresponding face shape. Using the data pair, a 3D model may be rendered from the sketch image.

In another example, a typical face and a base shape may be defined. The base shape may correspond to a group of parameters (e.g., coefficients of PCA eigen-values). A sketch example may be used to represent each typical face or base shape, such as the sketch image displays in FIGS. 1A-1C. A sketch may include 2D lines and allow a simple and direct representation of a face shape.

In an example a sketch image may give a simple, direct, and visual representation of a face shape. A user may select a sketch image, and a 3D model may deform to the desired shape with corresponding parameters. The customized base shapes may include whole face shape, eye, eyebrows, mouth, etc. Using the customized base shapes, a customized face shape may be generated and a 3D model may be rendered for use as avatar in an animation. When the face shape is selected and the 3D model is rendered, the corresponding blendshapes may also be rendered. Standard blendshapes may be made based on a mean shape. After the face shape and corresponding blendshapes are rendered, they may be used to animate the 3D model as an avatar.

Figure 3:
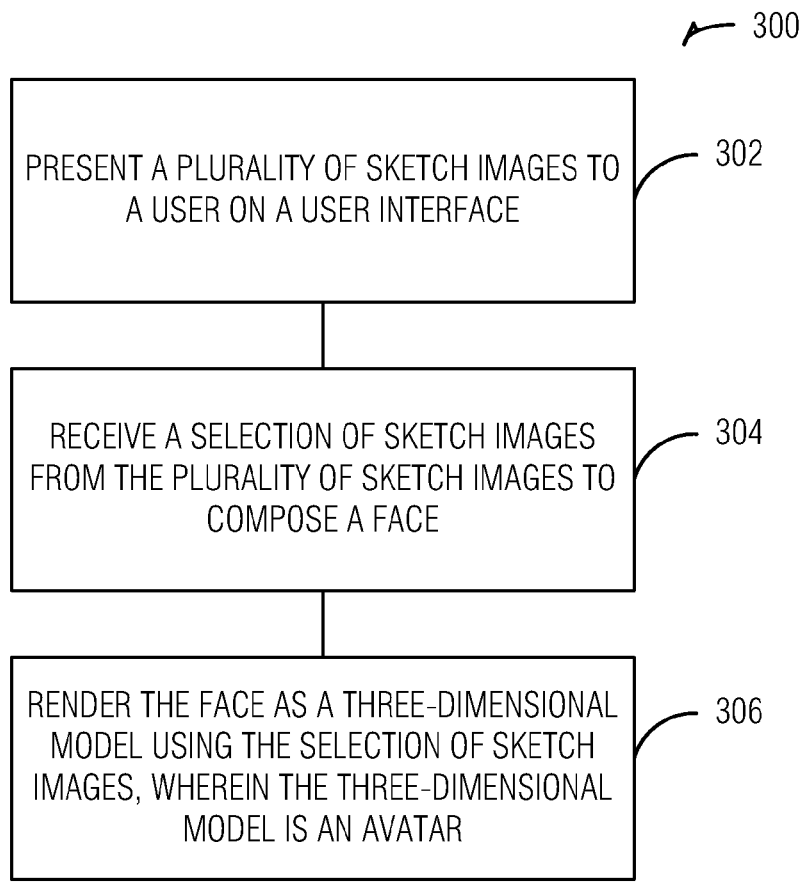
FIG. 3 is a flowchart illustrating a method for rendering a three-dimensional model for animating as an avatar from a sketch image, according to an embodiment.

FIG. 3 is a flowchart illustrating a method 300 for rendering a 3D model for animating as an avatar from a sketch image, according to an embodiment. A sketch image may be a 2D projection of a 3D model or may be a 2D representation of a 3D model. A sketch image may include component shape parts of a face, such as a head shape, a mouth shape, a nose shape, eye shapes, ear shapes, hair shapes, etc. In an example, a sketch image may include a combination of component shape parts of a face (e.g., eyes and nose, two ears, hair and beard, etc.). In another example, a sketch image may include shape parts of facial accessories, such as glasses, make-up, earrings, other piercings, tattoos, or the like. The shape parts of facial accessories may or may not be animated after a 3D model is rendered from the sketch images and animated. For example, earrings may move with ears, glasses may not move with eyes, etc.

The method 300 may include an operation 302 to present a plurality of sketch images to a user on a user interface. The user interface may include a user interface on a display device, such as a mobile device. The plurality of sketch images may be presented to the user in a list or grid for the user to select sketch images from the plurality of sketch images. In an example, the method 300 includes an operation 304 to receive a selection of sketch images from the plurality of sketch images to compose a face. The selection may include a selection of different sketch images for different facial features (e.g., head shape, eyes, ears, mouth, nose, etc.). The selection of different sketch images may include a selection of less than all sketch images (e.g., less than all presented sketch images, less than all possible sketch images, or less than all of the plurality of sketch images). A default set of sketch images may be selected automatically if a user does not select a sufficient number of sketch images to render a 3D model. In another example, a 3D model may be rendered without one or more typical facial features when a user does not select a sketch image for the one or more typical facial features. For example, a user may choose not to select a nose or ears, and a 3D model may be rendered without a nose or ears. Different modes may be selected to fill in default or random sketches automatically or render a 3D model without one or more typical facial features. The method 300 may include receiving a selection of sketch images from the plurality of sketch images to compose a face.

In an example, the method 300 may display the user interface at a display screen. The display screen may be a capacitive touch screen. The display screen may be on a mobile device. In an example, the user interface is on a mobile device that has a capacitive touch screen and a user may select a sketch image by touching the desired sketch image on the user interface. The method 300 may include receiving an indication from a capacitive touch screen. The indication may include a selected sketch image.

In another example, the method 300 may include receiving a selection of a base shape for a facial feature of a face. For example, a base shape for a facial feature of a face may include a base shape for a head of a face, a base shape for eyes of a face, a base shape for ears of a face, etc. The selection of the base shape may be received from a user indication of a selection of a sketch image mapped to the base shape. In another example, the selection of the base shape may be received after processing a selection of a sketch image. The facial feature may include a head, eyes, ears, nose, mouth, hair, etc. The base shape, for example, may include a round shape for a head, wide open eyes, eyes close together, a nose shape, pointy ears, or the like. The method 300 may include receiving a selection of a size for the base shape. For example, a selection of a size for a base shape may include a distance between eyes, height of ears on sides of a head, nose size, mouth width, lip size, mustache thickness, etc. The selection of the size for the base shape may be included in the selection of the base shape for the facial feature of the face, such as by a user selecting both together. In another example, the selection of the size and the selection of the base shape may be received separately (e.g., separately receiving a nose base shape and a size of the nose). The base shape may correspond to an eigen-vector and the size for the base shape may correspond to an eigen-value for the eigen-vector. In an example, the base shape may correspond to a plurality of eigen-vectors and the size for the base shape may correspond to a plurality of eigen-values for the eigen-vectors. In another example, the base shape may include a portion of a facial feature (e.g., a single eyelash, an upper lip, a plurality of hairs, etc.). The portion of the facial feature may correspond to an eigen-vector. For example, an eigen-vector may be used for each eyelash in a plurality of eyelashes, or an eigen-vector may be used for each of an upper lip and a bottom lip, etc. In another example, an eigen-vector may be used for an entire facial feature, such as a nose, an ear, or the like.

The method 300 may include an operation 306 to render the face as a three-dimensional model using the selection of sketch images, wherein the three-dimensional model is an avatar. In an example, a sketch image may be mapped to an aspect of a 3D model. For example, the method may include querying a database using information from a sketch image and receiving an aspect of the 3D model in response to the query. In another example, a sketch image may be conditionally mapped to an aspect of a 3D model, with the condition relating to other selected sketch images. For example, a sketch image may include a set of eyes and another selected sketch image may include a set of eyelashes. A set of eyes for a 3D model may be rendered from the set of eyes and a set of eyelashes for the 3D model may be rendered from the set of eyelashes. The combined set of eyes and set of eyelashes for the 3D model may be rendered from these two sketch images together or sequentially. In an example, rendering the combined sets from the two sketch images may result in a different 3D model if the rendering is done together (e.g., the conditional mapping) or sequentially. In another example, the rendered the 3D model may be the same whether the rendering is done together or sequentially.

To render the face, the method 300 may include rendering specific points for animation on the 3D model, such as points that may move on the 3D model (e.g., points around eyes, nose, mouth, etc.). Points may be excluded from regions of the 3D model that may not move or that are proximate to dense clusters of points. The method 300 may include receiving a request to edit the 3D model, such as a user indication to edit the 3D model. The method 300 may include presenting the selection of sketch images and the plurality of sketch images to the user for editing in response to the request to edit the 3D model. For example, a list or grid of the plurality of sketch images may be displayed on a user interface with the selected sketch images highlighted or indicated as selected. The method 300 may include receiving user input to modify a base version of a facial feature of the face. The method 300 may include receiving a parameterized value for the facial feature, such as a size. For example, the user may select a new base version of a facial feature, modify a size or change an aspect of a base version of a facial feature, or both. The parameterized value may include a size of an aspect or aspects of the base version of the facial feature. For example, the base version may include a nose and the parameterized value may include a size to stretch the nose.

The method 300 may include capturing a series of images of a user at an image capture device, computing facial motion data for each of the images in the series of images, and animating the avatar using the facial motion data. An image capture device may include a camera. In an example, the 3D model is the avatar that may be animated. Animating the avatar may include mimicking a user's facial motion. In an example, animating the avatar includes animating aspects of the 3D model, wherein the aspects of the 3D model are mapped to sketch images. The sketch images may be user selected 2D sketch images. A selection of sketch images may include a selection of base shapes and sizes for the base shapes. The base shapes and sizes for the base shapes may be compiled and rendered as the 3D model. The 3D model, rendered from the base shapes and sizes for the base shapes, may be animated. Animating the avatar may include animating the specific points described above.

Figure 4:
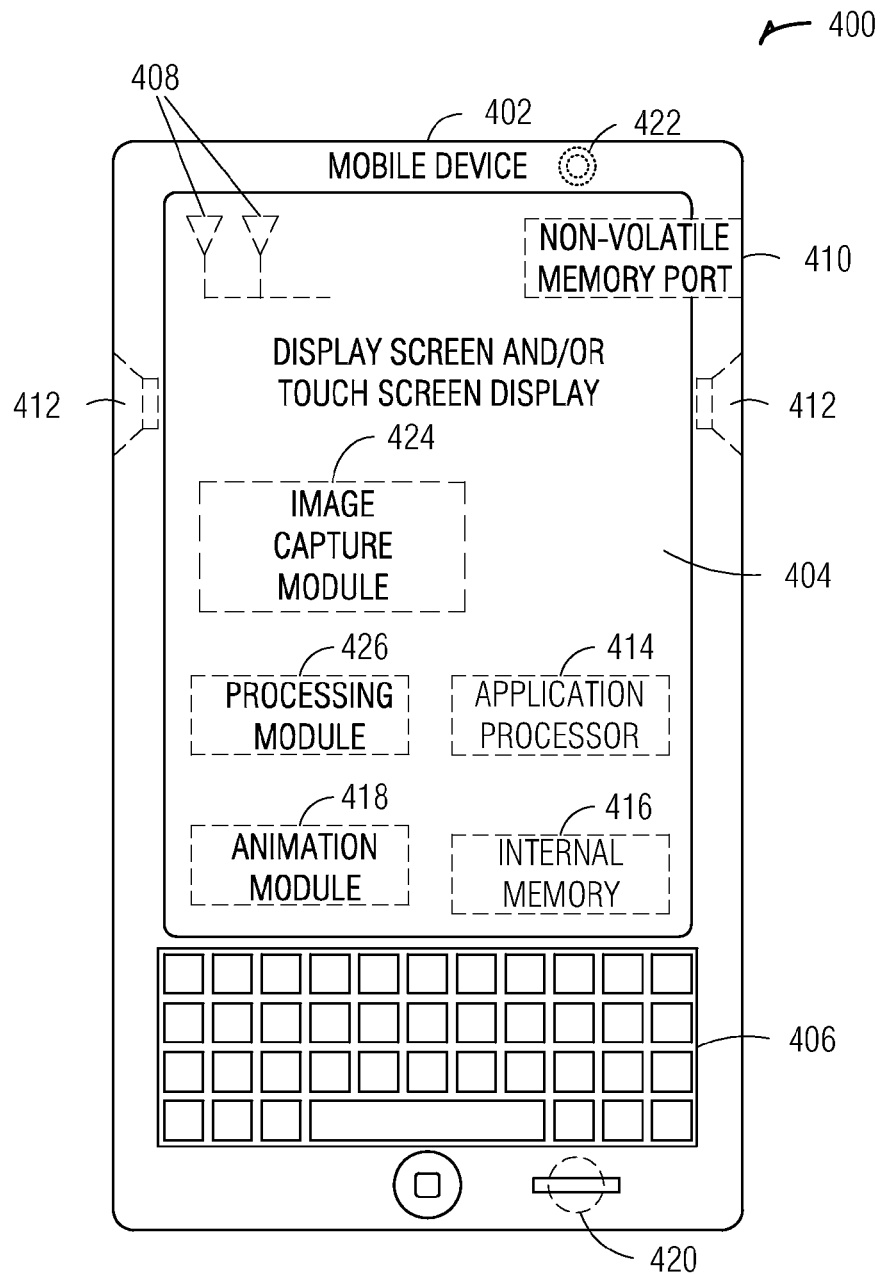
FIG. 4 is a diagram illustrating a mobile device on which the configurations and techniques described herein may be deployed, according to an embodiment.

FIG. 4 is a diagram illustrating a mobile device 400 on which the configurations and techniques described herein may be deployed, according to an embodiment. FIG. 4 provides an example illustration of a mobile device 400, such as a user equipment (UE), a mobile station (MS), a mobile wireless device, a mobile communication device, a tablet, a handset, or other type of mobile wireless computing device. The mobile device 400 may include one or more antennas 408 within housing 402 that are configured to communicate with a hotspot, base station (BS), an eNB, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 400 may communicate using separate antennas for each wireless communication standard or shared antennas for multiple wireless communication standards. The mobile device 400 may communicate in a WLAN, a WPAN, and/or a WWAN.

FIG. 4 also provides an illustration of a microphone 420 and one or more speakers 412 that may be used for audio input and output from the mobile device 400. A display screen 404 may be a liquid crystal display (LCD) screen, or other type of display screen such as an organic light emitting diode (OLED) display. The display screen 404 may be configured as a touch screen. The touch screen may use capacitive, resistive, or another type of touch screen technology. An application processor 414 and a graphics processor may be coupled to internal memory 416 to provide processing and display capabilities. A non-volatile memory port 410 may also be used to provide data input/output options to a user. The non-volatile memory port 410 may also be used to expand the memory capabilities of the mobile device 400. A keyboard 406 may be integrated with the mobile device 400 or wirelessly connected to the mobile device 400 to provide additional user input. A virtual keyboard may also be provided using the touch screen. A camera 422 located on the front (display screen) side or the rear side of the mobile device 400 may also be integrated into the housing 402 of the mobile device 400.

In an example, the mobile device 400 may include an image capture module 424, a processing module 426, or an animation module 418.

The processing module 426 may receive a selection of sketch images from a plurality of sketch images to compose a face. The selection may be a user selection. The processing module 426 may render the face as a three-dimensional model based on the selection of sketch images. The 3D module may be used as an avatar. The avatar may be animated and may mimic a user's facial actions. The processing module 426 may receive user input to modify a base version of a facial feature of the face, such as an eye, eyebrow, nose, mouth, hair, ear, chin, face shape, or the like. The user input may include a parameterized value for the facial feature, such as a size or change in the base version of the facial feature. The user input may include a finger touch on the display screen 404 to select the base version of the facial feature, and a drag of the finger to indicate size or change in the base version of the facial feature. The procession module 426 may receive an indication from a capacitive touch screen (e.g., the display screen 404).

The display screen 404 may display a user interface. The user interface may present a plurality of sketch images to a user. A selection of sketch images, such as user selected images from the plurality of sketch images, may include a selection of a base shape for a facial feature of a face. The selection of sketch images may include a selection of a size for the base shape. In an example, the base shape may correspond to an eigen-vector and the size for the base shape may correspond to an eigen-value for the eigen-vector.

The processing module 426 may receive a request to edit the three-dimensional model. In response to receiving the request to edit the three-dimensional model, the processing module 426 may present, on the user interface, a selection of sketch images and a plurality of sketch images to a user for editing. For example, the user interface may show the plurality of sketch images and highlight or otherwise indicate the currently selected selection of sketch images. The user may change the selection, such as by selecting a different base version of a facial feature or a change in the size of an aspect of the base version of a facial feature or both. The processing module 426 may render a new three-dimensional model using the user edits. The processing module 426 may render specific points for animation on the three-dimensional model.

The image capture module 424 may capture a series of images of a user, which the processing module 426 may use to compute facial motion data for each of the images in the series of images. The animation module 418 may animate the avatar using the facial motion data. The animation module 418 may animate the specific points rendered on the three-dimensional module by the processing module 426.

Figure 5:
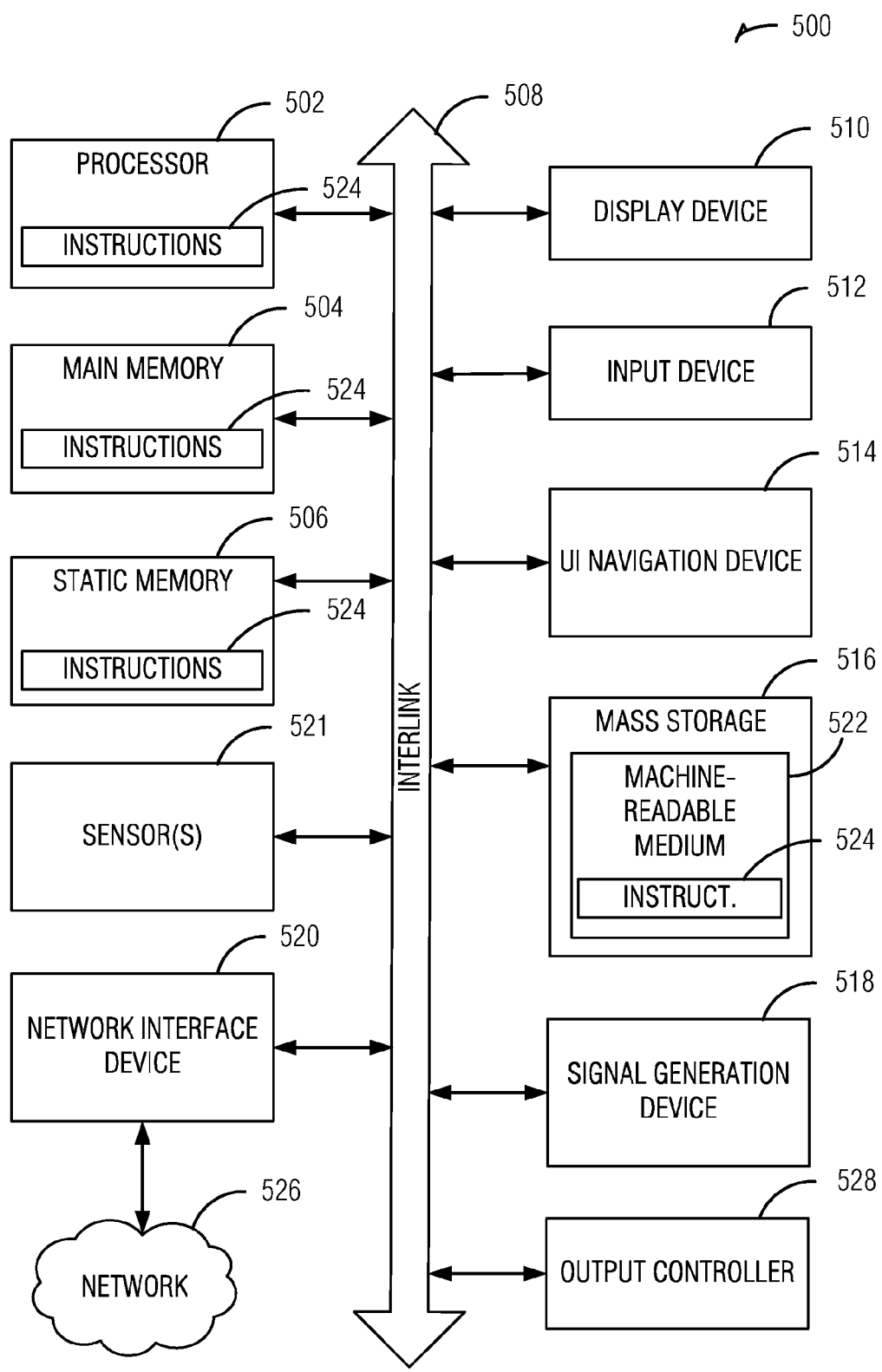
FIG. 5 is a block diagram of a machine upon which any one or more of the techniques (e.g., methodologies) discussed herein may perform, according to an embodiment.

FIG. 5 is a block diagram of a machine 500 upon which any one or more of the techniques (e.g., methodologies) discussed herein may perform, according to an embodiment. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 includes the subject matter embodied by a system for rendering a three-dimensional model comprising: a user interface to present a plurality of sketch images to a user, and a processing module to: receive a selection of sketch images from the plurality of sketch images to compose a face, and render the face as a three-dimensional model based on the selection of sketch images, wherein the three-dimensional model is an avatar.

In Example 2, the subject matter of Example 1 can optionally include wherein the processing module is to receive user input to modify a base version of a facial feature of the face.

In Example 3, the subject matter of one or any combination of Examples 1-2 can optionally include wherein to receive user input to modify the base version of the facial feature, the processing module is to receive a parameterized value for the facial feature.

In Example 4, the subject matter of one or any combination of Examples 1-3 can optionally include further comprising a display screen to display the user interface.

In Example 5, the subject matter of one or any combination of Examples 1-4 can optionally include wherein the display screen is a capacitive touch screen.

In Example 6, the subject matter of one or any combination of Examples 1-5 can optionally include wherein to receive the selection of sketch images the processing module is to receive an indication from the capacitive touch screen.

In Example 7, the subject matter of one or any combination of Examples 1-6 can optionally include further comprising: an image capture module to capture a series of images of a user, wherein the processing module is to compute facial motion data for each of the images in the series of images, and an animation module to animate the avatar using the facial motion data.

In Example 8, the subject matter of one or any combination of Examples 1-7 can optionally include wherein to render the face as a three-dimensional model, the processing module is to render specific points for animation on the three-dimensional model.

In Example 9, the subject matter of one or any combination of Examples 1-8 can optionally include wherein the animation module is to animate the specific points.

In Example 10, the subject matter of one or any combination of Examples 1-9 can optionally include wherein the processing module is to receive a request to edit the three-dimensional model.

In Example 11, the subject matter of one or any combination of Examples 1-10 can optionally include wherein the user interface is to present the selection of sketch images and the plurality of sketch images to the user for editing in response to the request to edit the three-dimensional model.

In Example 12, the subject matter of one or any combination of Examples 1-11 can optionally include wherein the selection of sketch images includes a selection of a base shape for a facial feature of the face.

In Example 13, the subject matter of one or any combination of Examples 1-12 can optionally include wherein the selection of sketch images includes a selection of a size for the base shape.

In Example 14, the subject matter of one or any combination of Examples 1-13 can optionally include wherein the base shape corresponds to an eigen-vector and the size for the base shape corresponds to an eigen-value for the eigen-vector.

Example 15 includes the subject matter embodied by a method for rendering a three-dimensional model comprising: presenting a plurality of sketch images to a user on a user interface, receiving a selection of sketch images from the plurality of sketch images to compose a face, and rendering the face as a three-dimensional model using the selection of sketch images, wherein the three-dimensional model is an avatar.

In Example 16, the subject matter of Example 15 can optionally include further comprising receiving user input to modify a base version of a facial feature of the face.

In Example 17, the subject matter of one or any combination of Examples 15-16 can optionally include wherein receiving user input to modifying the base version of the facial feature includes receiving a parameterized value for the facial feature.

In Example 18, the subject matter of one or any combination of Examples 15-17 can optionally include further comprising displaying the user interface at a display screen.

In Example 19, the subject matter of one or any combination of Examples 15-18 can optionally include wherein the display screen is a capacitive touch screen.

In Example 20, the subject matter of one or any combination of Examples 15-19 can optionally include wherein receiving the selection of sketch images includes receiving an indication from the capacitive touch screen.

In Example 21, the subject matter of one or any combination of Examples 15-20 can optionally include capturing a series of images of a user at an image capture device, computing facial motion data for each of the images in the series of images, and animating the avatar using the facial motion data.

In Example 22, the subject matter of one or any combination of Examples 15-21 can optionally include wherein rendering the face as a three-dimensional model includes rendering specific points for animation on the three-dimensional model.

In Example 23, the subject matter of one or any combination of Examples 15-22 can optionally include further comprising animating the specific points.

In Example 24, the subject matter of one or any combination of Examples 15-23 can optionally include further comprising receiving a request to edit the three-dimensional model.

In Example 25, the subject matter of one or any combination of Examples 15-24 can optionally include further comprising presenting the selection of sketch images and the plurality of sketch images to the user for editing in response to the request to edit the three-dimensional model.

In Example 26, the subject matter of one or any combination of Examples 15-25 can optionally include wherein receiving the selection of sketch images includes receiving a selection of a base shape for a facial feature of the face.

In Example 27, the subject matter of one or any combination of Examples 15-26 can optionally include wherein receiving the selection of sketch images includes receiving a selection of a size for the base shape.

In Example 28, the subject matter of one or any combination of Examples 15-27 can optionally include wherein the base shape corresponds to an eigen-vector and the size for the base shape corresponds to an eigen-value for the eigen-vector.

Example 29 includes at least one machine-readable medium including instructions for receiving information, which when executed by a machine, cause the machine to perform any of the methods of Examples 15-28.

Example 30 includes an apparatus comprising means for performing any of the methods of Examples 15-28.

Example 31 includes the subject matter embodied by an apparatus for rendering a three-dimensional model comprising: means for presenting a plurality of sketch images to a user on a user interface, means for receiving a selection of sketch images from the plurality of sketch images to compose a face, and means for rendering the face as a three-dimensional model using the selection of sketch images, wherein the three-dimensional model is an avatar.

In Example 32, the subject matter of Example 31 can optionally include further comprising means for receiving user input to modify a base version of a facial feature of the face.

In Example 33, the subject matter of one or any combination of Examples 31-32 can optionally include wherein the means for receiving user input to modifying the base version of the facial feature include means for receiving a parameterized value for the facial feature.

In Example 34, the subject matter of one or any combination of Examples 31-33 can optionally include further comprising means for displaying the user interface at a display screen.

In Example 35, the subject matter of one or any combination of Examples 31-34 can optionally include wherein the display screen is a capacitive touch screen.

In Example 36, the subject matter of one or any combination of Examples 31-35 can optionally include wherein the means for receiving the selection of sketch images include means for receiving an indication from the capacitive touch screen.

In Example 37, the subject matter of one or any combination of Examples 31-36 can optionally include means for capturing a series of images of a user at an image capture device, means for computing facial motion data for each of the images in the series of images, and means for animating the avatar using the facial motion data.

In Example 38, the subject matter of one or any combination of Examples 31-37 can optionally include wherein the means for rendering the face as a three-dimensional model include means for rendering specific points for animation on the three-dimensional model.

In Example 39, the subject matter of one or any combination of Examples 31-38 can optionally include further comprising means for animating the specific points.

In Example 40, the subject matter of one or any combination of Examples 31-39 can optionally include further comprising means for receiving a request to edit the three-dimensional model.

In Example 41, the subject matter of one or any combination of Examples 31-40 can optionally include further comprising means for presenting the selection of sketch images and the plurality of sketch images to the user for editing in response to the request to edit the three-dimensional model.

In Example 42, the subject matter of one or any combination of Examples 31-41 can optionally include wherein the means for receiving the selection of sketch images include means for receiving a selection of a base shape for a facial feature of the face.

In Example 43, the subject matter of one or any combination of Examples 31-42 can optionally include wherein the means for receiving the selection of sketch images include means for receiving a selection of a size for the base shape.

In Example 44, the subject matter of one or any combination of Examples 31-43 can optionally include wherein the base shape corresponds to an eigen-vector and the size for the base shape corresponds to an eigen-value for the eigen-vector.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. A system for rendering a three-dimensional model, the system comprising:
a display screen including a user interface to present a plurality of two-dimensional facial feature sketch images to a user, each two-dimensional facial feature sketch image of the two-dimensional facial feature sketch images mapped to a corresponding three-dimensional shape using three-dimensional parameters; and
a processor to:
receive a selection of two-dimensional facial feature sketch images from the plurality of two-dimensional facial feature sketch images to compose a face;
compare the selection of two-dimensional facial feature sketch images to a predetermined set of essential facial features that define a composed face;
determine a subset of the predetermined set of essential facial features missing from the selection of two-dimensional facial feature sketch images;
select two-dimensional facial feature sketch images from a default set of facial feature sketch images and corresponding to the subset of the set of essential facial features as system selected two-dimensional facial feature sketch images; and
render the face as a three-dimensional model based on the composed face comprising the selection of two-dimensional facial feature sketch images and the system selected two-dimensional facial feature sketch images, using the corresponding three-dimensional shape for each of the two-dimensional facial feature sketch images, wherein the three-dimensional model is an avatar.

2. The system of claim 1, wherein the processor is to receive user input to modify a base version of a facial feature of the face.

3. The system of claim 2, wherein to receive user input to modify the base version of the facial feature, the processor is to receive a weighting value for the facial feature.

4. The system of claim 1, wherein the display screen is a capacitive touch screen and to receive the selection of two-dimensional sketch images the processor is to receive an indication from the capacitive touch screen.

5. The system of claim 1, further comprising:
an image capture device to capture a series of images of a user, wherein the processor is to compute facial motion data for each of the images in the series of images, and
wherein the processor is further to animate the avatar using the facial motion data.

6. The system of claim 5, wherein to render the face as a three-dimensional model, the processor is to render specific points for animation on the three-dimensional model.

7. The system of claim 6, wherein the processor is to animate the specific points.

8. The system of claim 5, wherein the processor is to:
receive a selection of a two-dimensional facial feature accessory sketch image;
render the two-dimensional facial feature accessory sketch image as a three-dimensional facial feature accessory connected to a corresponding three-dimensional facial feature of the avatar.

9. The system of claim 8, wherein the processor is further to animate the three-dimensional facial feature accessory to move independently of the three-dimensional model.

10. The system of claim 1, wherein the processor is to receive a request to edit the three-dimensional model.

11. The system of claim 10, wherein the user interface is to present the selection of two-dimensional facial feature sketch images and the plurality of two-dimensional facial feature sketch images to the user for editing in response to the request to edit the three-dimensional model.

12. The system of claim 1, wherein the selection of two-dimensional facial feature sketch images includes a selection of a base shape for a facial feature of the face.

13. The system of claim 12, wherein the selection of two-dimensional facial feature sketch images includes a selection of a size for the base shape.

14. The system of claim 13, wherein the base shape corresponds to an eigen-vector and the size for the base shape corresponds to an eigen-value for the eigen-vector.

15. At least one non-transitory machine-readable medium including instructions for receiving information, which when executed by a machine, cause the machine to:
cause a plurality of two-dimensional facial feature sketch images to be presented to a user on a user interface of a display screen, each two-dimensional facial feature sketch image of the two-dimensional facial feature sketch images mapped to a corresponding three-dimensional shape using three-dimensional parameters;
receive a selection of two-dimensional facial feature sketch images from the plurality of two-dimensional facial feature sketch images to compose a face;
compare the selection of two-dimensional facial feature sketch images to a predetermined set of essential facial features that define a composed face;
determine a subset of the predetermined set of essential facial features missing from the selection of two-dimensional facial feature sketch images;
select two-dimensional facial feature sketch images from a default set of facial feature sketch images and corresponding to the subset of the set of essential facial features as system selected two-dimensional facial feature sketch images; and
render the face as a three-dimensional model based on the composed face comprising the selection of two-dimensional facial feature sketch images and the system selected two-dimensional facial feature sketch images, using the corresponding three-dimensional shape for each of the two-dimensional facial feature sketch images, wherein the three-dimensional model is an avatar.

16. The at least one machine-readable medium of claim 15, wherein the display screen is a capacitive touch screen and the operations to receive the selection of two-dimensional sketch images include operations to receive an indication from the capacitive touch screen.

17. The at least one machine-readable medium of claim 15, further comprising operations to:
capture a series of images of a user at an image capture device, compute facial motion data for each of the images in the series of images; and
animate the avatar using the facial motion data.

18. The at least one machine-readable medium of claim 17, wherein operations to render the face as a three-dimensional model include operations to render specific points for animation on the three-dimensional model.

19. The at least one machine-readable medium of claim 17, further comprising operations to:
receive a selection of a two-dimensional facial feature accessory sketch image;
render the two-dimensional facial feature accessory sketch image as a three-dimensional facial feature accessory connected to a corresponding three-dimensional facial feature of the avatar.

20. The at least one machine-readable medium of claim 19, further comprising operations to animate the three-dimensional facial feature accessory to move independently of the three-dimensional model.

21. The at least one machine-readable medium of claim 15, further comprising operations to receive a request to edit the three-dimensional model.

22. The at least one machine-readable medium of claim 21, further comprising operations to present the selection of two-dimensional facial feature sketch images and the plurality of two-dimensional facial feature sketch images to the user for editing in response to the request to edit the three-dimensional model.

23. A method for rendering a three-dimensional model, the method comprising:
presenting a plurality of two-dimensional facial feature sketch images to a user on a user interface on a display screen, each two-dimensional facial feature sketch image of the two-dimensional sketch images mapped to a corresponding three-dimensional shape using three-dimensional parameters;
receiving, at a processor, a selection of two-dimensional facial feature sketch images from the plurality of two-dimensional facial feature sketch images to compose a face;
comparing the selection of two-dimensional facial feature sketch images to a predetermined set of essential facial features that define a composed face;
determining a subset of the predetermined set of essential facial features missing from the selection of two-dimensional facial feature sketch images;
selecting two-dimensional facial feature sketch images from a default set of facial feature sketch images and corresponding to the subset of the set of essential facial features as system selected two-dimensional facial feature sketch images; and
rendering, using the processor, the face as a three-dimensional model using the composed face comprising the selection of two-dimensional facial feature sketch images and the system selected two-dimensional facial feature sketch images, using the corresponding three-dimensional shape for each of the two-dimensional facial feature sketch images, wherein the three-dimensional model is an avatar.

24. The method of claim 23, further comprising receiving user input to modify a base version of a facial feature of the face.

25. The method of claim 24, wherein receiving user input to modifying the base version of the facial feature includes receiving a weighting value for the facial feature.

* * * * *